United States Patent [19]

Harris

[11] 4,100,834
[45] Jul. 18, 1978

[54] CONTROLLING HARDNESS OF ANCHOR BOLT EXPANSION SLEEVES

[75] Inventor: Frederick John Harris, Clinton, Conn.

[73] Assignee: Olin Corporation, New Haven, Conn.

[21] Appl. No.: 749,599

[22] Filed: Dec. 10, 1976

[51] Int. Cl.² .............................................. F16B 13/06
[52] U.S. Cl. ...................................... 85/77; 148/12 R
[58] Field of Search .................. 85/77, 78, 74, 75, 79, 85/73, 83, 85, 76; 113/116 H; 72/DIG. 12; 148/134, 135, 12 R

[56] References Cited

U.S. PATENT DOCUMENTS

| 3,279,304 | 10/1966 | Hopkins | 85/77 |
| 3,667,341 | 6/1972 | Kaplan | 85/77 |
| 3,766,819 | 10/1973 | Giannuzzi | 85/77 |

FOREIGN PATENT DOCUMENTS 2,220,313  1/1973  Fed. Rep. of Germany............ 85/74

Primary Examiner—Ramon S. Britts
Attorney, Agent, or Firm—William W. Jones; Paul J. Lerner

[57] ABSTRACT

A masonry anchor including a sleeve having one or more protuberances extruded from its sidewall, said sleeve being annealed to a hardness not to exceed a Brinell hardness number of 230 so as to allow said protuberances to deform into a flattened state to increase the overall holding power of said anchor.

2 Claims, 2 Drawing Figures

CONTROLLING HARDNESS OF ANCHOR BOLT EXPANSION SLEEVES

BRIEF DESCRIPTION OF THE INVENTION

This invention relates to an anchor bolt assembly including a cylindrical bolt member and a tubular expansible sleeve member. The bolt having an expanding cone and the tubular sleeve member having one or more protuberances embossed or extruded from its main body for the purpose of providing a force fit to engage the wall of a hole in masonry and hold the sleeve member stationary during initial expansion of the anchor bolt assembly. It is of utmost importance to the development of maximum holding power that protuberances on the sleeve member flatten upon expansion of the anchor bolt assembly so that they do not transmit localized stress to the masonry, causing said masonry to fail under load, at the point of maximum engagement by the protuberances. To achieve the necessary flattening of the protuberances during expansion of the anchor bolt assembly, it is preferable that the tubular sleeve member be fabricated from metallic materials that are relatively soft. So as not to be limited by only a small group of metallic materials that might meet the range of hardness required to achieve the desired flattening, thermal treatment such as annealing can be utilized to reduce the hardness of the many metallic materials that respond to such treatment. Utilizing the step of annealing the material permits a wide range of materials to be selected for fabrication of the tubular sleeve member. This is advantageous since anchor bolt assemblies are often used under environmental conditions that require specific materials that are resistive to corrosion and other detrimental atmospheres.

Figures 1, 2:
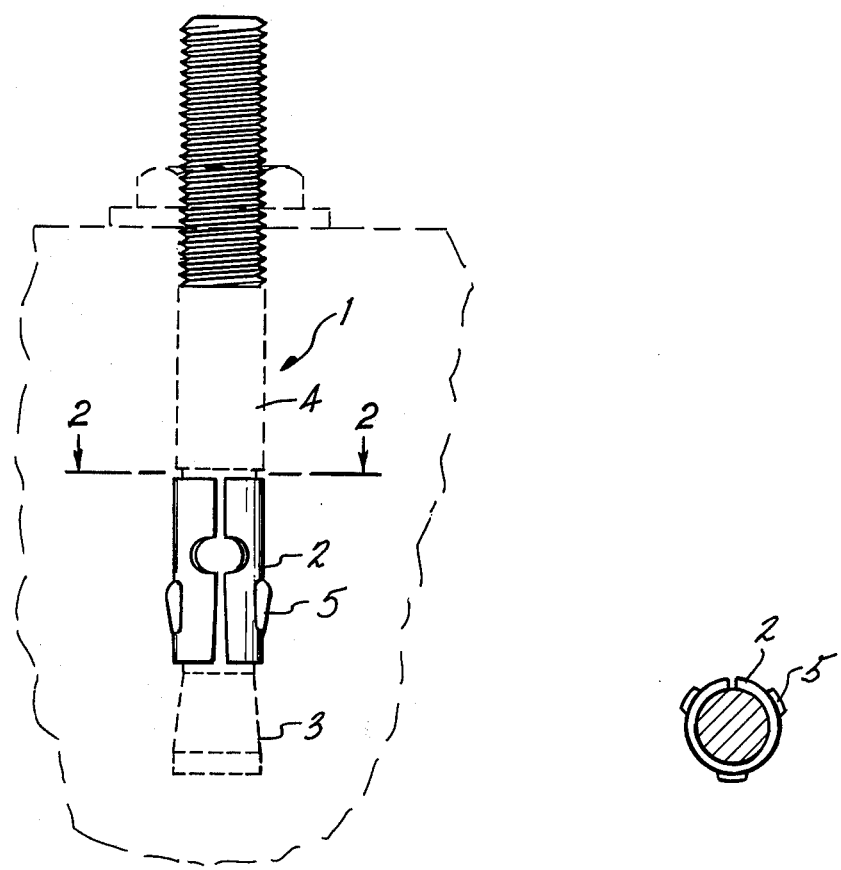
FIG. 1 is a side view of an anchor bolt assembly made in accordance with this invention.
FIG. 2 is a top plan view of a section of the anchor bolt assembly taken along the line 2—2 of FIG. 1.

This invention relates generally to an anchor bolt assembly generally indicated 1 in the drawings that has an expansion sleeve 2 to engage a hole in masonry such as concrete. In particular, it relates to anchor bolts of the type which are dependent upon a force fit of the expansion sleeve against the wall of the hole in the masonry for purposes of setting the anchor. The force fit of the expansion sleeve in the masonry hole is required to maintain the expansion sleeve 2 in embedded position while the tapered end 3 of the bolt 4 is drawn into the expansion sleeve 2 for the purpose of expanding the sleeve to frictionally engage the anchor bolt assembly to the masonry. It is preferable that the stress to the masonry caused by the expansion of the anchor bolt assembly be distributed over as large an area as possible so that the mechanical properties of the masonry are not exceeded causing preliminary failure by the initiation of cracks in the masonry. It is also preferable that the maximum force applied by the expansion sleeve be at the lowest possible position on the sleeve, namely, its deepest embedded end. Under that condition, tensile failure load of the masonry is maximized.

If, by virtue of the expansion sleeve design, one or more protuberances 5 are utilized as the means by which the installation force fit is achieved to keep the sleeve stationary during setting, then it is preferable that the protuberances be deformable upon anchor bolt expansion. If the protuberances do not sufficiently deform during expansion, then the point of maximum stress will be transmitted to the masonry by the protuberances, concentrating the stress over an undesirable small area. Inasmuch as the protuberances are preferably located in a higher plane than the forward lower edge of the sleeve so that the nominal sleeve diameter has unrestricted entry into the masonry hole, as shown in FIG. 1, the maximum diameter resulting from the protuberances is normally located about ⅓ the total sleeve length from top or bottom of the sleeve. With the maximum protuberance diameter located in a higher plane than the lower forward edge of the sleeve, the effective embedment of the anchorage is reduced. If the maximum stress is applied to the masonry by undeformable protuberances at a level closer to the surface of the masonry than the lower forward edge of the sleeve, the ultimate failure load of the masonry is reduced. In the case of anchor bolts with identical expansion sleeve design, but one having deformable protuberances and the other having rigid, undeformable protuberances, and installed to identical specifications, the anchor sleeve with deformable protuberances will have the deepest effective embedment and will yield the higher ultimate load capacity.

During the design and development of anchor bolt expansion sleeves protuberance configuration and material hardness selection must be given consideration so that the functional purpose of the protuberance with regard to setting is achieved without affecting the maximum load carrying capability of the anchor bolt. There are several alternatives to designing protuberances for anchor bolt expansion sleeves so that they serve their intended purpose. One method found in prior art designs is to fully shear all but a portion of the perimeter of the protuberance so that it is essentially hinged. This design is preferably made from a resilient material that has sufficient spring force to engage the hole wall to hold the sleeve stationary during setting but under expansion loading forces the protuberance back into its blanked out position, leaving the sleeve generally cylindrical and allowing the maximum load to be applied at the lower forward edge of the sleeve. Another method of forming protuberances is to partially shear the perimeter of the protuberances so that under expansion loading the protuberances are severed from the main body of the sleeve leaving it generally cylindrical. The foregoing design is probably best made from a hard or inelastic material that permits the severing of the protuberances by means of fracture. A preferable design which is the basis of this invention is to fabricate an expansion sleeve with protuberances extruded from and integral with the main body material. One embodiment of such a design is shown in U.S. Pat. No. 3,667,341. This design does not have the limitations of the first two described designs because it can be made from a wider selection of materials. The functionability and versatility of the extruded protuberance design is dependent upon the discovery that the protuberances be deformable into a flattened state upon expansion of the anchor bolt assembly. It is therefore necessary and desirable that the sleeve be relatively soft with a Brinell hardness number (BHN) of between 100 and 230. It is of course possible to select a material within that range of hardness for ease of manufacture. One material commonly available is cold rolled, low carbon strip steel with a No. 5 or dead soft temper. When that type of material is used, subsequent thermal treatment such as annealing is not generally required to reduce hardness into the desired range to get the desired flattening effect. However, if that particular material is not available or usable for other reasons, materials with harder tempers may be substituted and then given thermal treatment to reduce hardness into the desired range. Environmental requirements often make it necessary to fabricate anchor bolt assemblies from corrosion resistant materials such as stainless steel. Although stainless steel material is available in the desired hardness range, many types are susceptible to work hardening beyond the desired hardness range during forming of the sleeve. This problem can be alleviated again by thermal treatment which will restore the material to the desired hardness in accordance with the teachings of this invention. Additionally, many materials in the non-ferrous family may be used to fabricate an extruded protuberance sleeve design when treated in accordance with the teachings of this invention. Extruded protuberance design sleeves can be made from any material that is capable of having its hardness reduced to a generally broad range by heat treatment in accordance with this invention.

I claim:

1. An anchor for use in a pre-drilled hole in masonry or the like, said anchor including a sleeve structure of a work hardenable material having a Brinell hardness number in the range of 100 to 230 expandable into contract with the side of said hole, said sleeve including one or more extruded external protuberances adapted to initially engage the sidewall of said hole, said sleeve being annealed from an initial hardness exceeding a 230 Brinell hardness number to said Brinell hardness number in the range of 100 to 230 to reduce the effect of work hardening occasioned by the fabrication process, thereby allowing flattening of said protruberances and facilitating full area engagement of said sleeve with the side of said hole whereby formation of localized areas of stress concentration is prevented.

2. A method of forming a sleeve suitable for use in an anchor bolt assembly comprising the steps of forming said sleeve into the desired configuration including one or more embossed protruberances formed integral with said sleeve, said sleeve being formed of a work hardenable material having a hardness after fabrication exceeding a 230 Brinell hardness number; and heat treating said sleeve to reduce the effect of work hardening occasioned by the fabrication process, to a hardness within the range of 100–230 Brinell hardness number which will allow said protruberances to flatten when the sleeve is expanded into engagement with the sidewall of a hole to allow maximum area contact of the sleeve with the opening and eliminate localized stress points normally caused by said protruberances.

* * * * *